(12) United States Patent
Cho

(10) Patent No.: US 11,725,447 B2
(45) Date of Patent: Aug. 15, 2023

(54) STRUCTURE FOR ASSISTING OPENING AND CLOSING OF LOWER DOOR

(71) Applicants: Hyundai Motor Company, Seoul (KR); Kia Corporation, Seoul (KR)

(72) Inventor: Ki Hyun Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 99 days.

(21) Appl. No.: 17/375,871

(22) Filed: Jul. 14, 2021

(65) Prior Publication Data

US 2022/0205303 A1    Jun. 30, 2022

(30) Foreign Application Priority Data

Dec. 29, 2020 (KR) .................. 10-2020-0185736

(51) Int. Cl.
*B60J 5/04* (2006.01)
*E05F 15/63* (2015.01)

(52) U.S. Cl.
CPC ............ *E05F 15/63* (2015.01); *B60J 5/0473* (2013.01); *B60J 5/0477* (2013.01); *E05Y 2201/41* (2013.01); *E05Y 2201/422* (2013.01); *E05Y 2201/484* (2013.01); *E05Y 2201/624* (2013.01); *E05Y 2900/531* (2013.01)

(58) Field of Classification Search
CPC ........ B60J 5/0477; B60J 5/0473; B60J 5/042; B60J 2005/0475; B60J 5/0412; B60J 5/047; E05F 15/63; B60P 1/435
USPC .................................. 49/379, 276, 277, 364
See application file for complete search history.

(56) References Cited

U.S. PATENT DOCUMENTS

| 6,766,616 | B2 * | 7/2004 | Richter |
| 6,820,920 | B2 * | 11/2004 | Maeda |
| 6,955,390 | B2 * | 10/2005 | Rigorth et al. |
| 9,995,066 | B1 * | 6/2018 | Ottolini et al. |
| 2015/0257858 | A1 * | 9/2015 | Dischinger ............... A61C 7/36 433/24 |
| 2022/0205286 | A1 * | 6/2022 | Bendel et al. |

FOREIGN PATENT DOCUMENTS

| CN | 112918230 A | * | 6/2021 |
| JP | 09071133 A | * | 3/1997 |
| KR | 20190068287 A | | 6/2019 |

* cited by examiner

*Primary Examiner* — Daniel P Cahn
*Assistant Examiner* — Patrick B. Ponciano
(74) *Attorney, Agent, or Firm* — Slater Matsil, LLP

(57) ABSTRACT

A structure for assisting with opening and closing of a lower door includes a lower door having an upper end configured to be rotated open with respect to a bottom surface of a vehicle body, and a rotary unit configured to be fixed to the bottom surface of the vehicle body and configured to rotate in opposite directions to assist with opening and closing of the lower door.

14 Claims, 4 Drawing Sheets

STRUCTURE FOR ASSISTING OPENING AND CLOSING OF LOWER DOOR

CROSS-REFERENCE TO RELATED APPLICATIONS

This application claims the benefit of Korean Patent Application No. 10-2020-0185736, filed on Dec. 29, 2020, which application is hereby incorporated herein by reference.

TECHNICAL FIELD

The present disclosure relates to a structure for assisting with opening and closing of a lower door.

BACKGROUND

There are several types of doors for vehicles. Among the types of doors for vehicles, a swing type door that is mainly applied to a passenger car, a sliding type door that is mainly applied to a midsize van, and a hatchback type door that is mainly applied to a tail door of a van and Recreational Vehicle (RV) are exemplified.

On the other hand, a Purpose Built Vehicle (PBV), which extends living space, is emerging as a mobility of the future. For example, when PBVs respectively configured as a shoe shop and a clothing store are docked to a hub, the hub becomes a shopping center. Extensibility of a function and design according to the purpose of the PBV is substantially large. The PBV is a new type of mobility, which is not a private vehicle or a bus such as public transportation, and is used as a flexible space where the purpose of a hub is changed depending on the purpose of the PBV that is docked on the hub.

In future vehicles, tail doors are applied not only to the rear of the vehicle but also to the sides of the vehicle, thus allowing passengers to enter/exit from the sides of the vehicle as well as allowing loading of cargo. Among the types of tail doors, a clamshell door that splits into upper and lower parts in the middle takes less energy to open than opening and closing a single large tail door, and occupies less rear space, so that the clamshell door is in the spotlight. In addition, the clamshell door also provides a space for seating on a lower door, or allows placement of luggage closer to the bumper.

A ramp system of the clamshell door is configured to perform an opening and closing function of the lower door and to perform a foothold function for comfortable disembarking of passengers. A spindle drive capable of opening the ramp system needs to push the lower end of the ramp system to open the lower door due to a layout thereof. At this point, a high actuating force is required because it is necessary to push a point close to a hinge axis of the lower door. In addition, vehicles without a B-pillar require a structure that reduces the amount of door intrusion when a side collision of a vehicle occurs.

Korean Patent Application Publication No. 10-2019-0068287 may provide additional information related to the present disclosure.

SUMMARY

The present disclosure relates to a structure for assisting with opening and closing of a lower door. Particular embodiments relate to a structure capable of assisting a driving force for a lower door when the lower door is being opened, and also capable of minimizing injury to passengers and damage to a vehicle when a side collision occurs while the lower door is in a closed state.

Accordingly, embodiments of the present disclosure can address problems occurring in the related art, and embodiments of the present disclosure provide a structure for assisting with opening and closing of a lower door, the structure being configured to assist with the opening and closing of the lower door by assisting a driving force for the lower door via a rotary unit when the lower door is being opened.

In addition, embodiments of the present disclosure provide a structure for assisting with opening and closing of a lower door, the structure being configured to prevent deformation of a lower door by inserting the rotary unit into a side surface of the lower door when a side collision of a vehicle occurs while a vehicle door including an upper door and the lower door is in a closed state.

Embodiments of the present disclosure are not limited the aforementioned embodiments and other embodiments and advantages of the present disclosure which are not mentioned can be appreciated by the following description and will be made more apparent by the exemplary embodiments of the present disclosure. Further, the embodiments of the present invention may be implemented by means represented in the scope of the present invention and combinations thereof.

According to one embodiment of the present disclosure, there is provided a structure for assisting with opening and closing of a lower door, the structure including a lower door in which an upper end thereof is rotated open with respect to a bottom surface of a vehicle body, and a rotary unit fixed to the bottom surface of the vehicle body and configured to rotate in opposite directions to assist with opening and closing of the lower door.

In addition, the rotary unit may include a hook connection portion configured to rotate in opposite directions, a rotary shaft positioned at the hook connection portion, a first hook extended from a first side of the hook connection portion and formed to be bent downward toward an inside of the lower door in a closed state of the lower door, and a second hook extended from a second side of the hook connection portion and formed such that a first end thereof faces a lower end of an inside surface of the lower door in the closed state of the lower door.

In addition, the structure for assisting with opening and closing of a lower door may further include a groove formed on the inside surface of the lower door and into which a first end of the first hook is inserted.

In addition, the structure for assisting with opening and closing of a lower door may further include a vehicle body guide accommodated in the vehicle body below the rotary shaft, a hook guide connected to a second end of the second hook, and a spring provided on outer circumferential surfaces of the vehicle body guide and the hook guide such that a first end thereof is in contact with the bottom surface of the vehicle body, and a second end thereof is in contact with the second end of the second hook.

In addition, the rotary shaft may include a torsion spring connected to a side surface of the hook connection portion, and a stationary shaft penetrating through the hook connection portion.

In addition, the spring may be configured to be extended to push the second hook when the lower door is opened.

In addition, the spring may be configured to be compressed and the hook guide may be configured to move along the vehicle body guide when the lower door is closed.

In addition, when the lower door is switched to the opened state, the hook connection portion may be rotated so that the first end of the second hook pushes the lower end of the inside surface of the lower door, and the first end of the first hook may be released from the groove.

In addition, when the lower door is switched to the closed state, the hook connection portion may be rotated so that the first end of the second hook is in contact with the lower end of the inside surface of the lower door, and the first end of the first hook may be inserted into the groove.

In addition, the torsion spring may be configured to limit an amount of rotation of the hook connection portion.

In addition, the structure for assisting with opening and closing of a lower door may further include a drive unit positioned at an inside of the vehicle and configured to apply a driving force to the lower door, and a control unit configured to drive the drive unit in response to a signal for opening and closing the lower door.

Embodiments of the present disclosure may obtain the following effects based on the above embodiments and the configurations, combinations and relations that will be described later.

When the lower door is being opened, the driving force for the lower door may be assisted by pushing the lower door via the rotary unit.

In addition, the structure for assisting with opening and closing of a lower door is capable of preventing deformation of the lower door by inserting the rotary unit into the inside surface of the lower door when a side collision of a vehicle occurs while the vehicle door including the upper door and the lower door is in the closed state.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Hereinafter, embodiments of the present disclosure will be described more in detail with reference to the accompanying drawings. The embodiments of the present disclosure may be modified in various forms, and the scope of the present disclosure should not be construed as being limited to the following embodiments. The embodiments are provided to more fully explain the present disclosure to those skilled in the art.

In addition, the terms "portion" and "unit" described in the specification indicate a unit for processing at least one function or operation, which may be implemented by hardware or a combination of hardware.

In addition, the term "door" described in the specification includes both a door that opens in the front and rear directions of the vehicle, and a door that opens in opposite directions in the width direction of the vehicle. The present disclosure will be described with the door that opens in the width direction of the vehicle.

In addition, the term "closed state" described in the specification refers to a state in which a lower door 200 is closed, and the term "opened state" refers to a state in which the lower door 200 is fully opened.

In addition, in the specification, when a part is positioned "on" or "above" another part, this includes not only when a part is "directly on" another part but also when there is another part disposed between two parts. In addition, in the specification, when a part is positioned "under" or "below" another part, this includes not only when a part is "directly under" another part but also when there is another part disposed between two parts.

In addition, in the specification, "upper end" refers to a direction moving to the top in the height direction according to a drawing, and "lower end" refers to a direction moving to the bottom in the height direction according to a drawing.

In addition, some of the components are called a first, a second, etc., throughout the detailed descriptions in an effort to distinguish such components from one another because they have the same configurations, but in the description below, such a sequence is not limiting.

Figure 1:
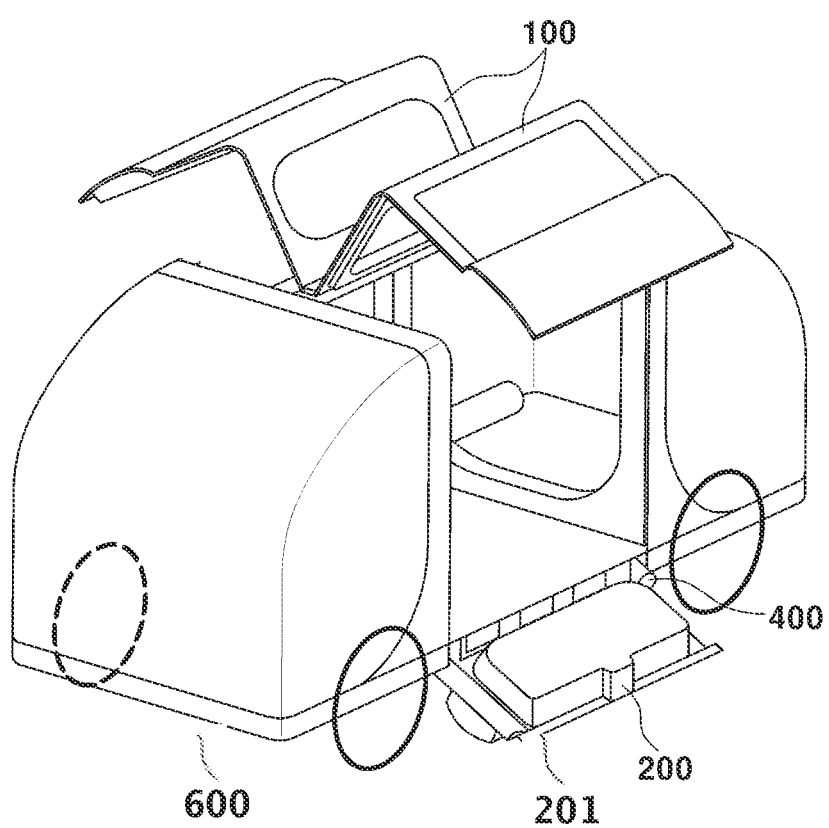
FIG. 1 is a view illustrating a lower door-opened state of a structure for assisting with opening and closing of a lower door according to an embodiment of the present disclosure.

FIG. 1 is a view illustrating a lower door-opened state of a structure for assisting with opening and closing of a lower door according to an embodiment of the present disclosure.

With reference to FIG. 1, a vehicle door may include an upper door 100 and a lower door 200. A lower end of the upper door 100 may be rotated open with respect to a first end of a vehicle roof. The lower door 200 may be provided adjacent to the lower end of the upper door 100 which is to be opened. An upper end 201 of the lower door 200 may be rotated open with respect to a bottom surface 600 of a vehicle body. In one embodiment, the lower door 200 may be a clamshell door.

The lower door 200 may be opened by applying a driving force of a drive unit 400. When the lower door 200 is fully opened, passengers may enter/exit via the lower door. More preferably, when the passengers are entering and exiting, an outside surface of the lower door 200 is in contact with an outer floor surface, such that convenience of entering and exiting and support stability may be realized.

The lower door 200 may be rotated open with respect to a hinge point connected to the bottom surface of the vehicle body. The hinge point of the lower door 200 may be positioned lower in a height direction than a position of the inside surface of the lower door 200 where the drive unit 400 applies the driving force. On the inside surface of the lower door 200, a sloped surface towards the lower outer portion may be formed.

Figure 2:
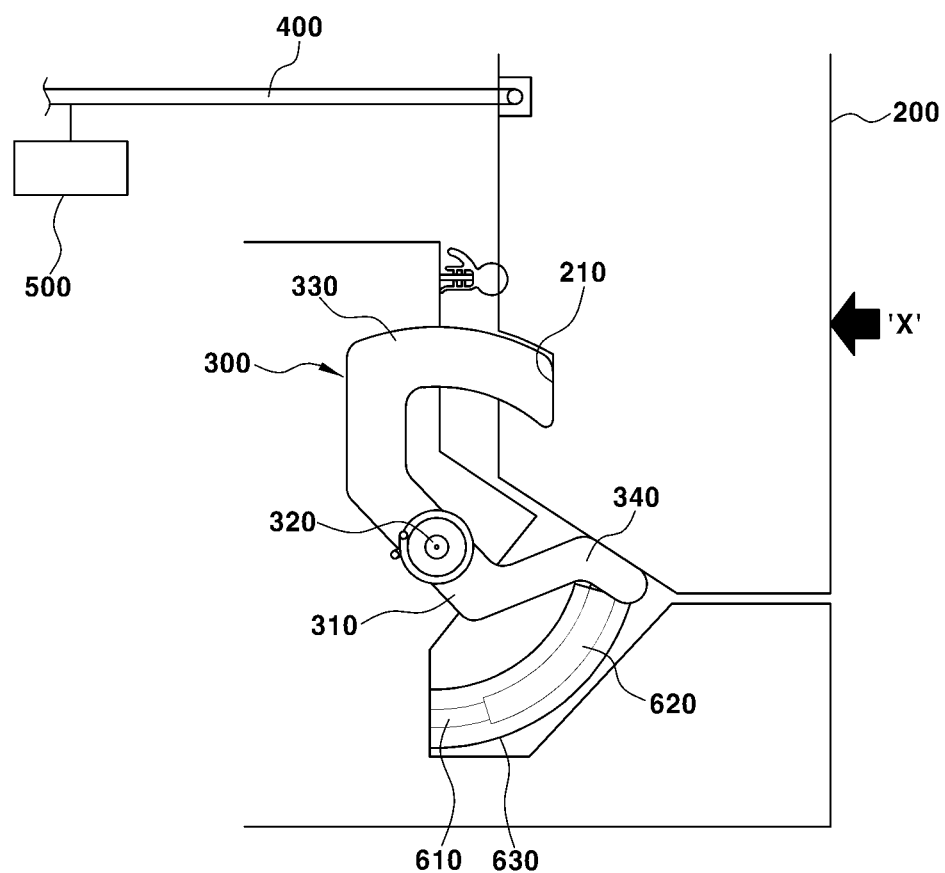
FIG. 2 is a view illustrating the structure for assisting with opening and closing of a lower door in a closed state according to an embodiment of the present disclosure.

FIG. 2 illustrates the structure for assisting with opening and closing of a lower door in a closed state according to an embodiment of the present disclosure.

With reference to FIG. 2, the structure for assisting with opening and closing of a lower door according to an embodiment of the present disclosure may be configured to include a rotary unit 300, the drive unit 400, and a control unit 500.

The rotary unit 300 may be fixed to the bottom surface of the vehicle body. More preferably, at least one rotary unit 300 may be provided on the bottom surface of the vehicle body and is configured to rotate in opposite directions.

The rotary unit 300 may include a hook connection portion 310, a rotary shaft 320, a first hook 330, and a second hook 340. The hook connection portion 310 may be configured to rotate in opposite directions. More preferably, the hook connection portion 310 may be rotated in opposite directions with respect to the rotary shaft 320 positioned at the hook connection portion 310.

The hook connection portion 310 may be rotated in a counterclockwise direction as illustrated in FIG. 2 when the lower door 200 is being opened, and may be rotated in a clockwise direction when the lower door 200 is being closed.

The first hook 330 may be formed by extending from a first side of the hook connection portion 310. The first hook 330 may have a shape that is bent downward toward the inside of the lower door 200 in the closed state. In one embodiment, the first hook 330 may be extended and configured to be folded at a predetermined angle from the hook connection portion 310 and formed to be bent at a first end thereof. In another embodiment, the first hook 330 may be extended in a curve from the hook connection portion 310 and be formed to be bent at the first end thereof.

A groove 210 may be formed on the inside surface of the lower door 200. More preferably, in the closed state, the first end of the first hook 330 may be inserted into the groove 210. The groove 210 may have a shape wherein the first end of the first hook 330 is inserted without interference.

The groove 210 may be formed so as to correspond to a length into which the first end of the first hook 330 is inserted. In a fully closed state, the first end of the first hook 330 may be in contact with the end of the groove 210, such that the amount of movement of the lower door 200 may be limited and the amount of deformation of the lower door 200 during a side collision of a vehicle may be limited.

The second hook 340 may be formed by extending from a second side of the hook connection portion 310. In the closed state, a first end of the second hook 340 may be formed to face a lower end of an inside of the lower door 200. More preferably, in the closed state, the sloped inside surface of the lower door 200 and the first end surface of the second hook 340 may be contacted at an angle corresponding to each other, so that a surface-connected state may be maintained.

The structure for assisting with opening and closing of a lower door according to an embodiment of the present disclosure may be configured to further include a vehicle body guide 610, a hook guide 620, and a spring 630. The vehicle body guide 610 may be fixed to the bottom surface of the vehicle body below the rotary shaft 320. The hook guide 620 may be connected to a second end of the second hook 340. A first end of the hook guide 620 may be connected to the second end of the second hook 340 and may be configured to move along the vehicle body guide 610. More specifically, the vehicle body guide 610 and the hook guide 620 may be a cylindrical shape, and may be formed such that the diameter of the hook guide 620 is larger than the diameter of the vehicle body guide 610. The hook guide 620 may be configured to move along the vehicle body guide 610 without interference.

The spring 630 may be provided on outer circumferential surfaces of the vehicle body guide 610 and the hook guide 620. A first end of the spring 630 may be in contact with the bottom surface of the vehicle body and a second end of the spring 630 may be in contact with the second end of the second hook 340. The vehicle body guide 610, the hook guide 620, and the spring 630 may be extended in a curve.

In the closed state, the spring 630 may maintain a compressed state. When the door is switched from the opened state to the closed state, and the inside surface of the lower door 200 pushes the first end of the second hook 340, the hook guide 620 may be rotated in the clockwise direction as illustrated in FIG. 2. At this point, the hook guide 620 may be rotationally moved along the vehicle body guide 610 in the clockwise direction.

In the opened state, the spring 630 may maintain a released state. When the door is switched from the closed state to the opened state, the hook guide 620 and the second hook 340 are rotated in the counterclockwise direction, such that the first end of the second hook 340 may push the inside surface of the lower door 200. At this point, the hook guide 620 may be rotationally moved along the vehicle body guide 610 in the counterclockwise direction.

An elastic force of the spring 630 may be configured to work with the opening and closing of the lower door 200. More preferably, the spring 630 is compressed in the closed state, such that an elastic reaction force may be stored. When the door is switched from the closed state to the opened state, the driving force of the drive unit 400 may be assisted by the elastic reaction force stored in the spring 630. In other words, the first end of the second hook 340 may be configured to push the inside surface of the lower door 200 by an elastic restoring force of the spring 630.

More specifically, in the closed state, a portion where the first end of the second hook 340 is in contact with the inside surface of the lower door 200 may be positioned at the inside of the hinge point of the lower door 200. When the door is switched from the closed state to the opened state, the elastic force of the spring 630 may apply momentum to the second end of the second hook 340. The restoring force of the spring 630 is provided in the same direction which the lower door 200 is initially rotated open, and the first end of the second hook 340 may apply the momentum to the inside surface of the lower door 200, such that the driving force for opening the door may be assisted.

The spring 630 may be configured such that a position value thereof does not change during compression or recovery by the vehicle body guide 610 and the hook guide 620.

The drive unit 400 is positioned on the inside of the vehicle and may apply the driving force to the lower door 200. In one embodiment, the drive unit 400 may include an actuator and a spindle. The actuator is configured to apply the driving force to the spindle, and the spindle is configured to move in a longitudinal direction thereof by the actuator. The spindle may be configured to be extended in the longitudinal direction thereof when the driving force is applied by the actuator. The lower door 200 may be configured to be opened at a predetermined angle when the spindle is extended to the longitudinal direction thereof.

The control unit 500 may drive the drive unit 400 in response to a signal for opening and closing the lower door 200. In one embodiment, when a lower door 200 opening signal is applied, the control unit 500 may control the actuator so that the spindle is extended in the longitudinal direction thereof. In addition, when the lower door 200 closing signal is applied, the control unit 500 may control the actuator so that the spindle is shortened in the longitudinal direction thereof.

When the control unit 500 operates the drive unit 400 so as to close the lower door 200, the spindle may be shortened in the longitudinal direction thereof. The spring 630 may be compressed when the lower door 200 is fully closed. At this point, the hook guide 620 may be configured to move along the vehicle body guide 610.

When the lower door 200 is switched to the closed state, the hook connection portion 310 is rotated so that the first end of the second hook 340 may be in contact with the lower end of the inside surface of the lower door 200. In addition, the hook connection portion 310 may be rotated so that the one end of the first hook 330 is inserted into the groove 210.

When the door is switched from the opened state to the closed state, the inside surface of the lower door 200 pushes the first end of the second hook 340 first, and the hook connection portion 310 is rotated, such that the first end of the first hook 330 may be inserted into the groove 210.

More preferably, when the lower door 200 is switched from the opened state to the closed state and the lower end of the inside surface of the lower door 200 is in contact with the second hook 340, the hook connection portion 310 may be rotated in the clockwise direction as illustrated in FIG. 2. At this point, the spring 630 may be configured to be gradually compressed. The hook connection portion 310 rotates so that the first end of the first hook 330 may face a beginning portion of the groove 210. When the lower door 200 is fully closed, the first hook 330 may be fully inserted into the groove 210. The first end of the second hook 340 may be surface-connected to the lower end inside of the lower door 200.

Figure 3:
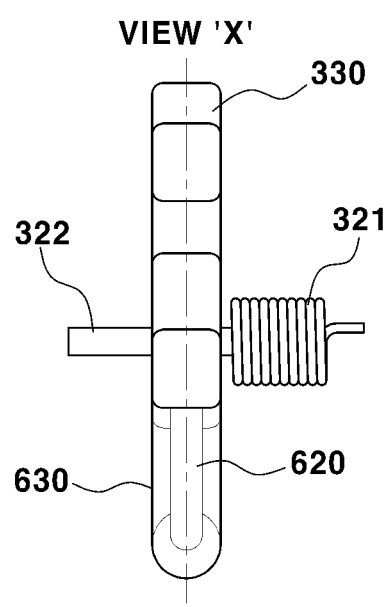
FIG. 3 is a view illustrating a rotary shaft of the structure for assisting with opening and closing of a lower door according to an embodiment of the present disclosure.

FIG. 3 is a view illustrating the rotary shaft 320 of the structure for assisting with opening and closing of a lower door according to an embodiment of the present disclosure.

With reference to FIG. 3, the rotary shaft 320 may be configured to include a torsion spring 321 and a stationary shaft 322. The torsion spring 321 may be connected to a side surface of the hook connection portion 310. More preferably, an elastic force of the torsion spring 321 may be configured to work with the rotation of the hook connection portion 310. The torsion spring 321 may be configured to limit the amount of rotation of the hook connection portion 310.

In the closed state, the torsion spring 321 may store an elastic reaction force. When the door is switched from the closed state to the opened state, the elastic reaction force of the torsion spring 321 may assist the driving force. In addition, the torsion spring 321 may limit excessive rotation of the hook connection portion 310 in the counterclockwise direction as illustrated FIG. 4.

The stationary shaft 322 may be formed to penetrate through the hook connection portion 310. More preferably, the stationary shaft 322 may fix the hook connection portion 310 to the vehicle body by penetrating through the hook connection portion 310 and the vehicle body. The hook connection portion 310 may be configured to rotate in opposite directions with respect to the stationary shaft 322.

Figure 4:
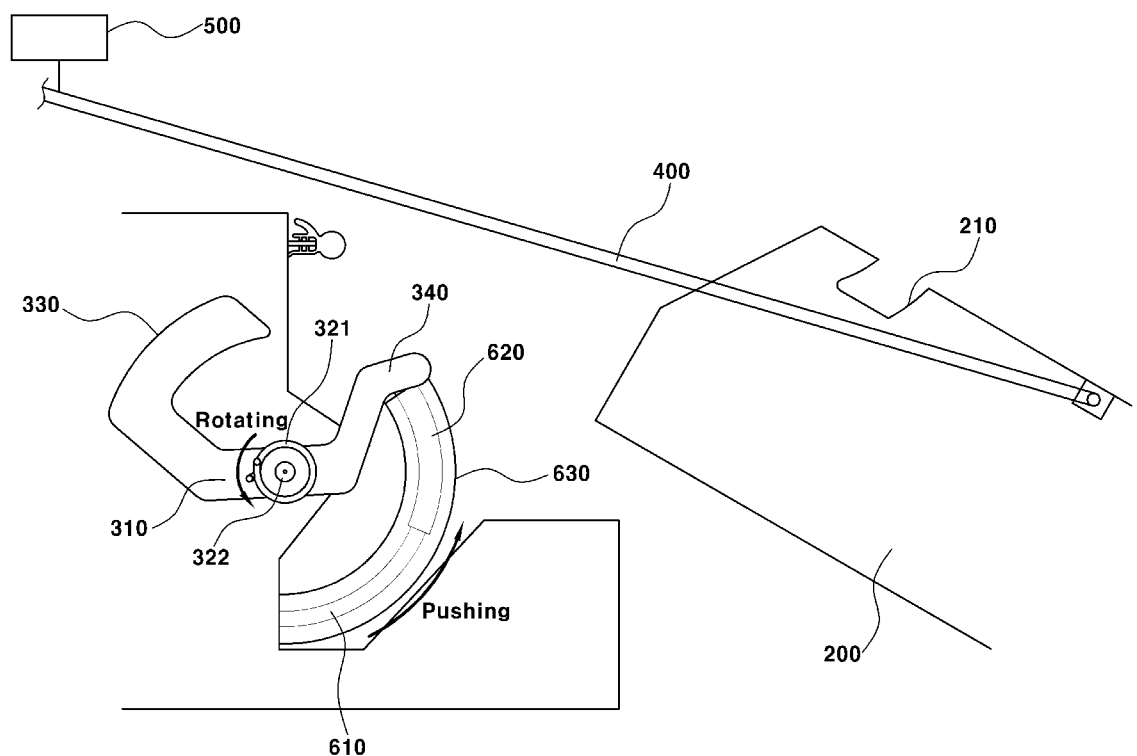
FIG. 4 is a view illustrating the structure for assisting with opening and closing a lower door in an opened state according to an embodiment of the present disclosure.

FIG. 4 illustrates the structure for assisting with opening and closing a lower door in the opened state according to an embodiment of the present disclosure.

With reference to FIG. 4, when the control unit 500 operates the drive unit 400 to open the lower door 200, the spindle may be extended in the longitudinal direction thereof. When the lower door 200 is fully opened, the spring 630 may be fully extended. That is, the spring may be configured to be extended to push the second hook 340. At this point, the hook guide 620 may be configured to move along the vehicle body guide 610.

When the lower door 200 is switched to the opened state, the hook connection portion 310 rotates so that the first end of the second hook 340 pushes the lower end of the inside surface of the lower door 200, such that the first end of the first hook 330 may be configured to be released from the groove 210.

More preferably, when the lower door 200 is switched from the closed state to the opened state such that the first end of the second hook 340 pushes the lower end of the inside surface of the lower door 200, the hook connection portion 310 may be rotated in the counterclockwise direction as illustrated in FIG. 4. At this point, the spring 630 may be configured to be gradually released. The hook connection portion 310 rotates so that the first end of the first hook 330 may be released from the groove 210.

In summary, embodiments of the present disclosure provide a structure for assisting with opening and closing of a lower door. The structure of embodiments of the present disclosure is configured to assist the driving force when the lower door 200 is opened by the rotary unit 300, and also configured to prevent deformation of the lower door 200 when the side collision of a vehicle occurs in the closed state.

The above-described detailed descriptions are only examples of the present disclosure. In addition, the above-described descriptions have described exemplary embodiments of the present disclosure, and the present disclosure may be used in various other combinations, modifications, and environments. That is, the present disclosure may be changed and modified in a range of the concept and in an equivalent range of the content of the disclosure disclosed in the present specification and/or in technology or knowledge in the art. The described embodiments describe the best state for implementing the concept of the present disclosure, and various modifications required for applying the present disclosure to specific fields and uses may be possible. Accordingly, the above-described detailed description of the present disclosure does not limit the present disclosure to the embodiments disclosed. In addition, the appended claims should be interpreted to include other embodiments.

What is claimed is:

1. A structure comprising:
a lower door having an upper end configured to be rotated open with respect to a bottom surface of a vehicle body;
a rotary unit configured to be attached to the bottom surface of the vehicle body and configured to rotate in opposite directions to assist with opening and closing of the lower door, wherein the rotary unit comprises:
a hook connection portion configured to rotate in opposite directions;
a rotary shaft positioned at the hook connection portion;
a first hook extended from a first side of the hook connection portion and bent downward toward an inside of the lower door in a closed state of the lower door; and
a second hook extended from a second side of the hook connection portion, wherein a first end of the second hook faces a lower end of an inside surface of the lower door in the closed state of the lower door;
a vehicle body guide configured to be accommodated in the vehicle body below the rotary shaft:
a hook guide connected to a second end of the second hook; and
a spring configured to be provided on outer circumferential surfaces of the vehicle body guide and the hook guide, wherein a first end of the spring is configured to be in contact with the bottom surface of the vehicle body, and a second end of the spring is in contact with the second end of the second hook, wherein the vehicle body guide, the hook guide, and the spring extend in a curve.

2. The structure of claim 1, further comprising a groove on the inside surface of the lower door, wherein a first end of the first hook is configured to be inserted into the groove.

3. The structure of claim 2, wherein when the lower door is switched to an opened state, the hook connection portion is configured to be rotated so that the first end of the second hook pushes the lower end of the inside surface of the lower door, and the first end of the first hook is released from the groove.

4. The structure of claim 2, wherein when the lower door is switched to a closed state, the hook connection portion is configured to be rotated so that the first end of the second hook is in contact with the lower end of the inside surface of the lower door, and the first end of the first hook is inserted into the groove.

5. The structure of claim 1, wherein the spring is configured to be extended to push the second hook when the lower door is opened.

6. The structure of claim 1, wherein the spring is configured to be compressed and the hook guide is configured to move along the vehicle body guide when the lower door is closed.

7. The structure of claim 1, wherein the rotary shaft comprises:
a torsion spring configured to engage with the rotation of the hook connection portion; and
a stationary shaft penetrating through the hook connection portion.

8. The structure of claim 7, wherein the torsion spring is configured to limit an amount of rotation of the hook connection portion.

9. A structure comprising:
a lower door having an upper end configured to be rotated open with respect to a bottom surface of a vehicle body;
a rotary unit configured to be attached to the bottom surface of the vehicle body and configured to rotate in opposite directions to assist with opening and closing of the lower door, wherein the rotary unit comprises:
a hook connection portion configured to rotate in opposite directions;
a rotary shaft positioned at the hook connection portion;
a first hook extended from a first side of the hook connection portion and bent downward toward an inside of the lower door in a closed state of the lower door; and
a second hook extended from a second side of the hook connection portion, wherein a first end of the second hook faces a lower end of an inside surface of the lower door in the closed state of the lower door;
a drive unit configured to be positioned at an inside of the vehicle body and configured to apply a driving force to the lower door;
a control unit configured to drive the drive unit in response to a signal for the opening or the closing of the lower door;
a vehicle body guide configured to be accommodated in the vehicle body below the rotary shaft:
a hook guide connected to a second end of the second hook; and
a spring configured to be provided on outer circumferential surfaces of the vehicle body guide and the hook guide, wherein a first end of the spring is configured to be in contact with the bottom surface of the vehicle body, and a second end of the spring is in contact with the second end of the second hook, wherein the vehicle body guide, the hook guide, and the spring extends in a curve.

10. The structure of claim 9, further comprising a groove on the inside surface of the lower door, wherein a first end of the first hook is configured to be inserted into the groove.

11. The structure of claim 10, wherein when the lower door is switched to an opened state, the hook connection portion is configured to be rotated so that the first end of the second hook pushes the lower end of the inside surface of the lower door, and the first end of the first hook is released from the groove.

12. The structure of claim 10, wherein when the lower door is switched to a closed state, the hook connection portion is configured to be rotated so that the first end of the second hook is in contact with the lower end of the inside surface of the lower door, and the first end of the first hook is inserted into the groove.

13. The structure of claim 9, wherein the rotary shaft comprises:
a torsion spring configured to engage with the rotation of the hook connection portion; and
a stationary shaft penetrating through the hook connection portion.

14. A vehicle comprising:
a vehicle body;
a lower door coupled to the vehicle body and having an upper end configured to be rotated open with respect to a bottom surface of the vehicle body;
a rotary unit attached to the bottom surface of the vehicle body and configured to rotate in opposite directions to assist with opening and closing of the lower door, wherein the rotary unit comprises:
a hook connection portion configured to rotate in opposite directions;
a rotary shaft positioned at the hook connection portion;
a first hook extended from a first side of the hook connection portion and bent downward toward an inside of the lower door in a closed state of the lower door; and
a second hook extended from a second side of the hook connection portion, wherein a first end of the second hook faces a lower end of an inside surface of the lower door in the closed state of the lower door;
a vehicle body guide accommodated in the vehicle body below the rotary shaft;
a hook guide connected to a second end of the second hook;
a spring provided on outer circumferential surfaces of the vehicle body guide and the hook guide, wherein a first end of the spring is in contact with the bottom surface of the vehicle body, and a second end of the spring is in contact with the second end of the second hook;
a drive unit positioned at an inside of the vehicle and configured to apply a driving force to the lower door; and
a control unit configured to drive the drive unit in response to a signal for the opening or the closing of the lower door, wherein the vehicle body guide, the hook guide, and the spring extends in a curve.

\* \* \* \* \*